O. A. North.
Clothes Hook.

N°. 85,756. Patented Jan. 12, 1869.

Witnesses.
Rich Storter
Hiram Belden

Inventor.
O. A. North

United States Patent Office.

O. A. NORTH, OF NEW BRITAIN, CONNECTICUT.

Letters Patent No. 85,756, dated January 12, 1869.

IMPROVEMENT IN CLOTHES-HOOK.

The Schedule referred to in these Letters Patent and making part of the same.

*To all whom it may concern:*

Be it known that I, O. A. NORTH, of New Britain, county of Hartford, and State of Connecticut, have invented certain new and useful Improvements in Coat and Dress-Supporter; and to enable others skilled in the art to make and use the same, I will proceed to describe its construction and operation, by referring to the drawings, in which the same letters indicate like parts in each of the figures.—

The nature of this invention will be understood from the specification and drawings, in which—

Figure 1:
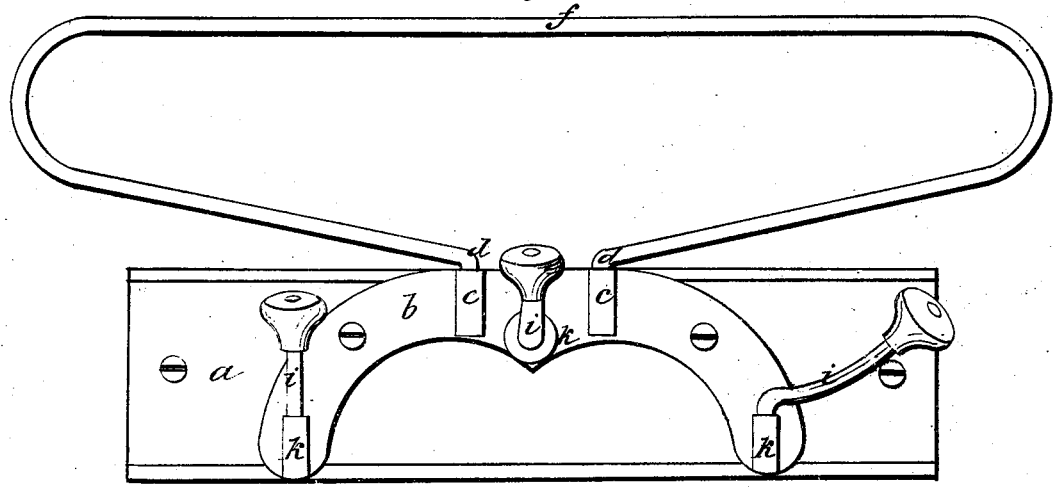
Figure 1 is a front view.
Figure 2:
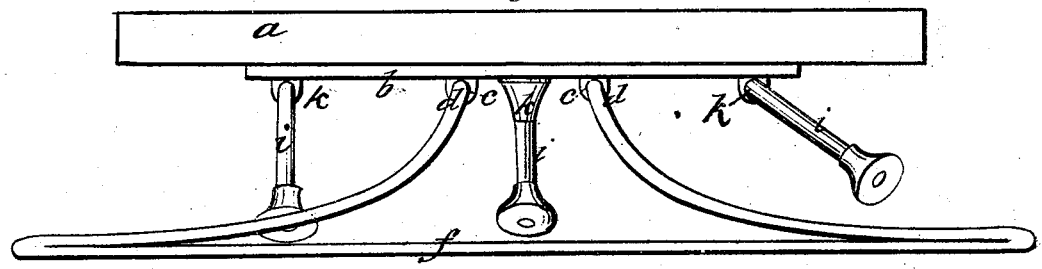
Figure 2 is a top-edge view.

*a* is a standard, support, or cleat, to which the plate *b* is secured.

*c c* are sockets, into which the ends, *d d*, of the garment-supporter *f* enter and are secured.

*i i i* are hooks, which are screwed or oscillate in the sockets *k k k*.

This supporter is formed of bent-metal rod or wire, so as to produce the required shape for any given purpose.

The advantage of this invention will be at once apparent, as, for instance, if a gentleman has a choice garment, he will be enabled to more perfectly secure or keep it in proper shape, by placing the arm-holes upon the outer ends of the supporter *f*, and its shape still better preserved by hanging other garments upon the hooks *i*, which distend or swell out the body of the garment.

This supporter may be made of various shapes, to suit any required object.

Thus it will be seen that the supporter may be easily taken apart and put together, when desirable, and that several garments may be hung together in a small space, and at the same time protect them from injury.

I have thus endeavored to show the nature, construction, and advantage of this invention, so as to enable others skilled to make and use the same therefrom.

What I claim, therefore, and desire to secure by Letters Patent, is—

The plate *b*, with the supporter *f*, in combination with the fixed or vibrating hooks *i*, substantially as and for the purpose described.

O. A. NORTH.

Witnesses:
 RICH'D S. PORTER,
 HIRAM BELDEN.